United States Patent [19]
Pracilio

[11] 3,891,369
[45] June 24, 1975

[54] APPARATUS FOR TEACHING VACUUM FORMING AND PRESSURE FORMING

[75] Inventor: Francis Paul Pracilio, Pelham Manor, N.Y.

[73] Assignee: Educational Machinery Corporation, New Rochelle, N.Y.

[22] Filed: Dec. 21, 1972

[21] Appl. No.: 317,135

[52] U.S. Cl............. 425/174; 425/387 R; 425/388; 425/324 R; 35/52
[51] Int. Cl. ........................................... B29c 17/04
[58] Field of Search .......... 425/388, 174, 387, 324; 35/52

[56] References Cited
UNITED STATES PATENTS

| | | | |
|---|---|---|---|
| 2,690,593 | 10/1954 | Abercrombie | 425/388 X |
| 2,912,718 | 11/1959 | Thiel | 425/324 |
| 2,952,875 | 9/1960 | Herrick | 425/324 X |
| 3,133,314 | 5/1964 | Arnould et al. | 425/388 |
| 3,181,202 | 5/1965 | Martelli et al. | 425/324 |
| 3,307,222 | 3/1967 | Baldwin et al. | 425/388 X |
| 3,317,960 | 5/1967 | Kramer | 425/388 X |
| 3,368,243 | 2/1968 | Kohen | 425/388 |
| 3,377,656 | 4/1968 | Tilden | 425/388 |
| 3,751,208 | 8/1973 | Hepworth | 425/388 |

Primary Examiner—Robert L. Spicer, Jr.
Attorney, Agent, or Firm—Hubbell, Cohen & Stiefel

[57] ABSTRACT

Machine for instruction in vacuum forming and pressure forming including two pumps, one a vacuum pump and the other a pressure pump which can be selectively actuated for vacuum forming and pressure forming, respectively. Interlock means may be included to prevent the simultaneous actuation of both pumps. A movable platen is included for supporting a mold thereon.

10 Claims, 4 Drawing Figures

3,891,369

APPARATUS FOR TEACHING VACUUM FORMING AND PRESSURE FORMING

BACKGROUND OF THE INVENTION a. Field Of The Invention

This invention relates to instructional devices and particularly to an apparatus for teaching vacuum forming and pressure forming.

b. The Prior Art

Apparatus for vacuum forming and pressure forming has been known heretofore. However, such apparatus has included a single pump and valve means for arranging the pump so that it either pressurizes the molding chamber or draws a vacuum therein. It has also been known to use a movable platen in a pressure forming device, however, the movable platen has not been used in vacuum forming to the best of applicant's knowledge nor has such a movable platen ever been employed in a device which can perform both vacuum forming and pressure forming.

SUMMARY OF THE INVENTION

The apparatus of the present invention includes a pump chamber and a pressure chamber. Two pumps, one for drawing a vacuum and one for pressurizing are disposed in the pump chamber and are connected to the pressure chamber for causing a pressurized condition or a vacuum condition therein. Framing the pressure chamber is a support flange for sheet thermoplastic and associated with the flange is a movable frame for sandwiching the sheet between the support flange and the frame to hold its edges in fixed position during either the pressure or vacuum forming operation. Disposed within the pressure chamber is a perforated platen which is movable by a rack and pinion arrangement in the vertical direction. The platen is useful in supporting a mold and to move the mold into operative relation with the sheet plastic during a vacuum forming operation. A hood or cover overlies the apparatus and carries underneath it an electric heating coil. The hood is slidable from a retracted position overlying the pump chamber to an extended position in which it overlies the pressure chamber for heating the sheet plastic disposed thereover.

DESCRIPTION OF THE PREFERRED EMBODIMENTS

Figure 1:
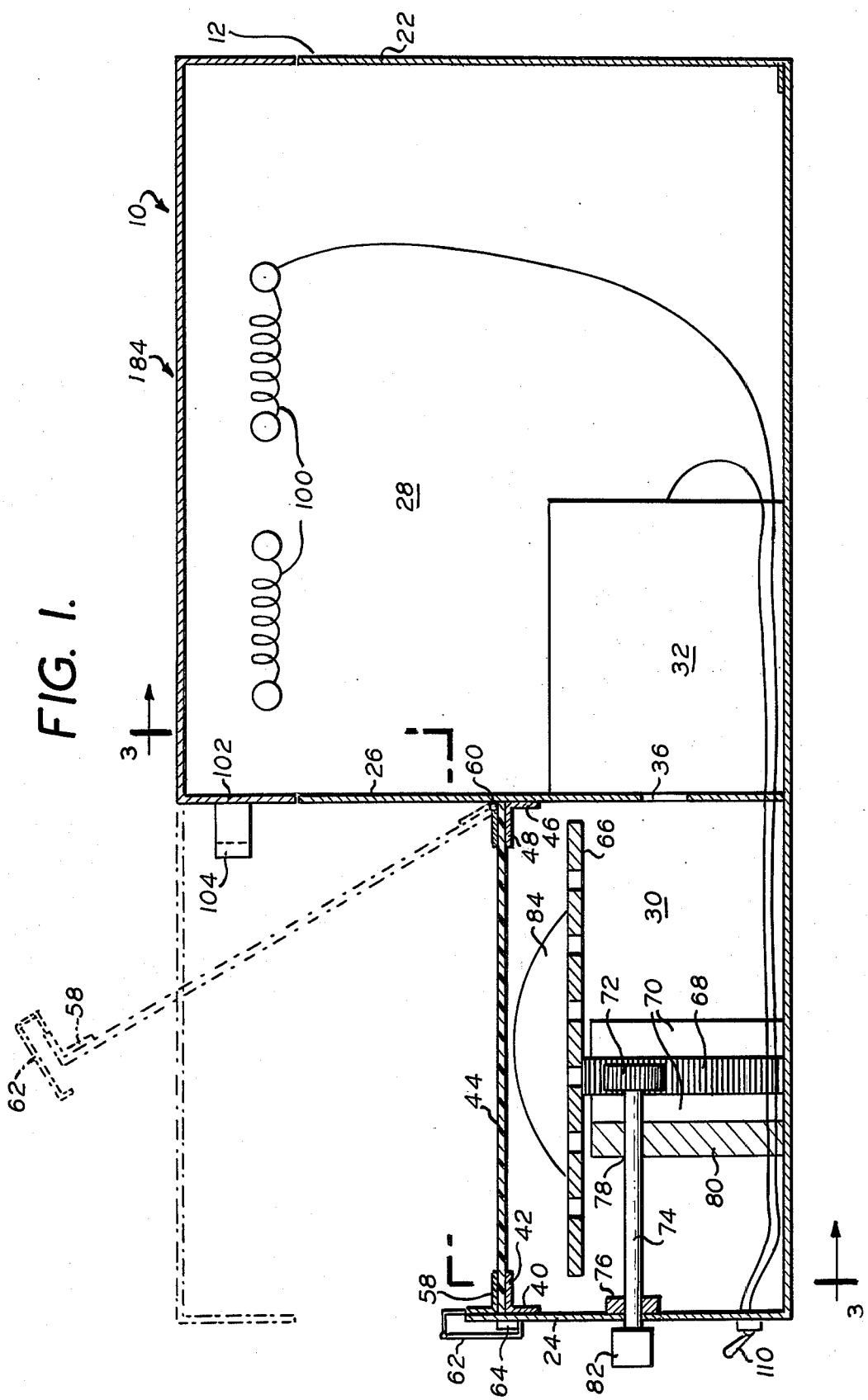
FIG. 1 is a vertical sectional view of the apparatus of the present invention taken in a longitudinal direction.

Referring now to the drawings in detail, the machine for teaching both pressure forming and vacuum forming is generally designated by the reference numeral 10. The apparatus 10 includes a housing 12 made of a U-shaped member 14 defining the sides 16 and 18 of the housing 12, and the bottom 20. A back 22 and a front 24 are secured to the U-shaped member 14 as by welding or rivets or the like to form the housing. Extending across the housing in between the back 22 and the front 24 is a partition wall 26 which partially defines a rear pump chamber 28 and a forward pressure chamber 30.

Disposed within the pump chamber 28 are a pressure pump 32 and a vacuum pump 34 each of which is in communication with the pressure chamber 30 by means of apertures 36 and 38, respectively, in the partition wall 26. Secured to the front 24 adjacent the top of the pressure chamber 30 is an angle 40 the horizontal portion 42 of which forms a support flange for a sheet of plastic 44 to be molded. Secured to the partition 26 is a similar angle 46 having a horizontal portion 48 coplanar with the portion 42. Similarly two angles 50 and 52 are secured to the sides 16 and 18, respectively, overlying the upper end of the chamber 30 with their horizontal portions 54 and 56 coplanar with the portions 42 and 48, whereby to define a horizontal plane for supporting the plastic sheet 44.

To hold the plastic sheet 44 securely along its edges during the molding operaton to thereby enclose the pressure chamber 30 so that it may be pressurized or a vacuum may be drawn therein, a holding frame 58 is provided which holding frame has basically a rectangular configuration similar to the horizontal portion of the support flange. The holding frame 58 is pivotally mounted on a hinge 60 secured to the partition wall 26 and is movable from a horizontal position in which it holds the thermoplastic sheet 44 betweeen it and the support flange and from and to a substantially vertical position shown in dotted lines in FIG. 1 in which the plastic sheet 44 may either be inserted in or removed from the apparatus. At the front of the frame 58 there is pivotally secured a latch 62 which may be hooked under a stud 64 on the front 24 to hold the holding frame 58 in its horizontal position and lock it in that position.

Disposed within the pressure chamber 30 is a perforated platen 66 that is supported by a rack 68 which is guided by a U-shaped vertical guide 70 to permit vertical movement of the rack 68. In meshed relation with the rack 68 is a pinion 72 supported on a rotatable shaft 74 that is rotatably mounted in bearings 76 and 78, respectively, provided on the front wall 24 and on a bearing support 80. Shaft 74 extends through the front 24 and is provided with a handle 82 for rotating the shaft. When the handle is operated to rotate shaft 74 the platen, which is adapted to support a mold 84, brings that mold into engagement with a heated plastic sheet 44 whereby to cause the plastic sheet to take on the shape of the mold.

To soften the thermoplastic sheet 44 a heating hood 184 is slidably mounted on the sides 14 and 16 of the housing 12 for movement from a retracted position shown in FIG. 1 to an extended position in which the hood overlies the pressure chamber 30. Specifically, to affect the slidable mounting of the hood 184 on the sides 16 and 18 of housing 12, the upper end of the sides are bent on themselves to form channels 86 and 88, best seen in FIG. 3, and the top of the hood housing 184 has underlying it a pair of longitudinally extending Z-shaped members 90 and 92, the bottoms 94 and 96, respectively, of which extend beneath the channels 86 and 88 whereby to hook the cover 84 onto the housing 12. Secured to the Z-shaped members 90 and 92 are a plurality of electrical insulators 98 which support a serpentine arranged electrical heating coil 100 on the under-side of the hood cover 184. Secured to the front 102 of the cover 84 is a handle 104 which may be grasped to slide the hood 84 back and forth along the channels 86 and 88.

Figure 2:
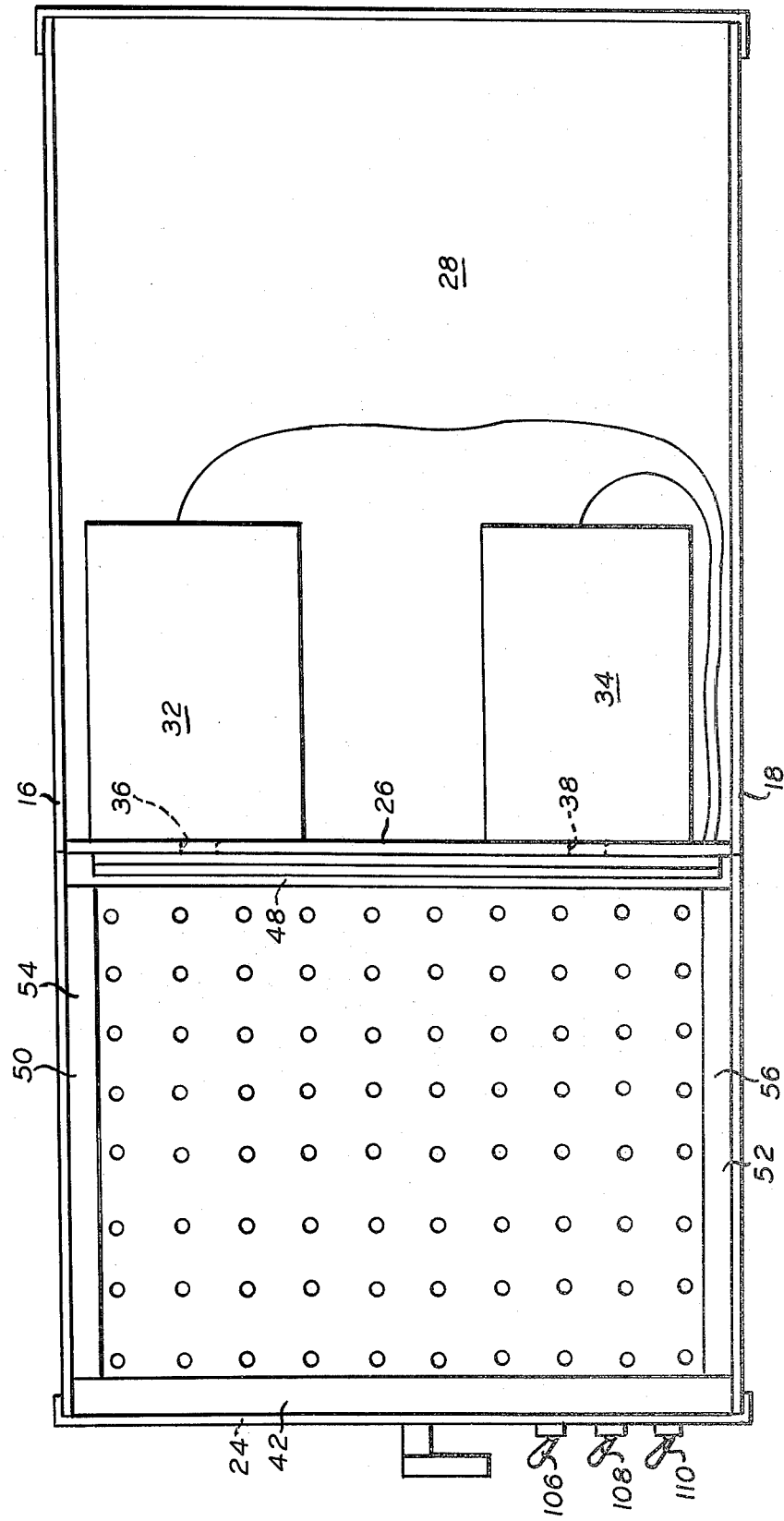
FIG. 2 is a top plan view of the apparatus with the heating hood removed.

As shown best in FIG. 2, secured to the front 24 are three toggle switches 106, 108 and 110, respectively, arranged to control the energization of the pressure pump 32, the vacuum pump 34 and the electric heating coil 100. Thus, the three elements of the apparatus may be independently controlled from the front of the panel.

In use, the hood 184 is moved to its retracted position as shown in FIG. 1. The latch 62 is disengaged from the stud 64 and is swung back whereby to free the frame 58 for pivotal movement from its solid line position as shown in FIG. 1 to its dotted line position as shown in FIG. 1. In this position a sheet of thermoplastic may be disposed on the horizontal support flange made up of the members 42, 48, 54 and 56. The frame 58 may then be swung downwardly back from its dotted line position to its solid line position and the latch 62 can be engaged whereby to lock the locking frame 58 in its solid line position in FIG. 1 to thereby hold the thermoplastic sheet 44 in the position illustrated in FIG. 1 and FIG. 3 to provide a seal for the chamber 30. The handle 104 of hood 184 may then be grasped to move the hood 184 from its retracted position as shown in FIG. 1 to its extended postion in which it overlies the sheet 44 and in this position the switch 106 may be thrown to close the energizing circuit for the heating coil 100 whereby to heat the sheet 44 and cause it to soften. At the same time, either the switch 108 or 110 may be closed to energize either the pressure pump 32 or the vacuum pump 34 to subject the softened sheet 44 to either pressure or vacuum.

Figure 3:
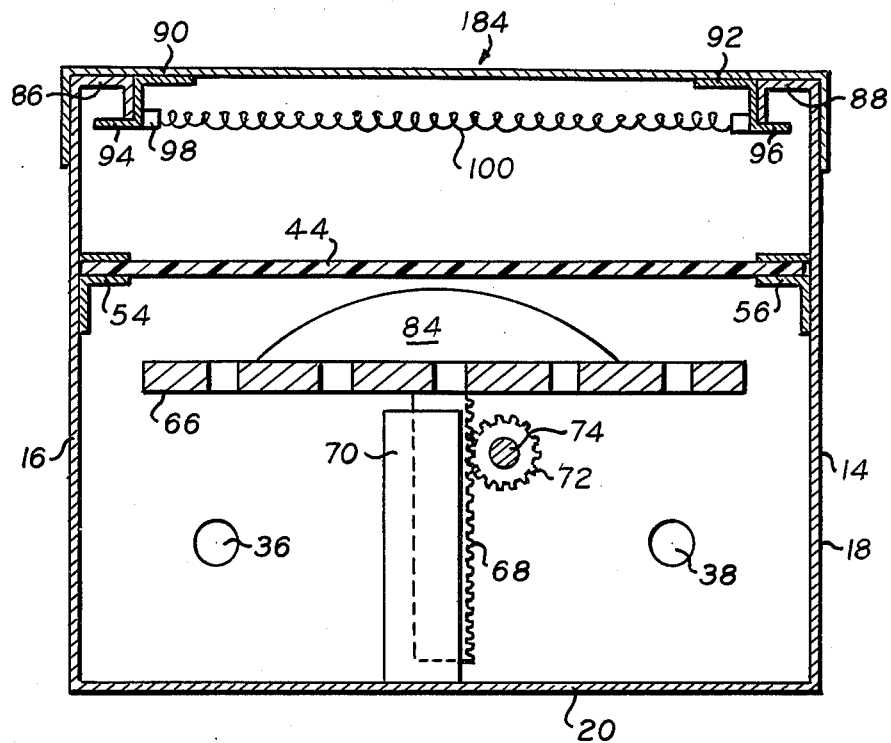
FIG. 3 is a sectional view taken along the line 3—3 of FIG. 1.

For this instructional apparatus, all the pressure forming can do is to blow a bubble which is adequate for the instructional process. However, when vacuum forming is to be performed, a mold 84 may be disposed on a movable platen 66 and the movable platen may be adjustably positioned by the rack 68 and pinion 72 to bring the mold into engagement with the softening and sagging sheet 44 as it is heated and yields to the vacuum being drawn by the pump 34 through the aperture 38. Depending upon the amount of vacuum being drawn and the nature of the mold 84, the position of the mold may be adjusted from a fully retracted position as shown in FIG. 3 to an extended position in which the platen 66 may be substantially coplanar with the support flange. This assures deep mold impressions on the sheet 44 as may be desirable for certain applications.

Upon the forming operation being completed, the heating coils 100 may be deenergized as may the pump 32 and 34 and the hood 184 be pushed to the retracted position of FIG. 1 whereby to expose the now formed sheet 44. After the sheet is cooled, the frame 58 may be unlocked and swung to its dotted line position shown in FIG. 1 whereby to enable the removal of the now formed sheet 44. This will enable the apparatus to receive a new sheet for a repetition of the above described steps.

Figure 4:
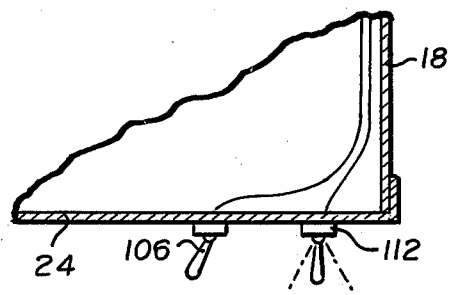
FIG. 4 is a fragmentary view similar to FIG. 2 illustrating a modification of the present invention.

It may be desirable under certain circumstances to provide means for interlocking the pressure pump 32 with the vacuum pump 34 whereby to assure that they will not both operate simultaneously. Many means for interlocking these two pumps may be provided. A simple means is a three way switch 112 that is shown in FIG. 4. Using a three way switch, the pump 32 may be energized with the switch in its left hand position as shown in FIG. 4, the pump 34 may be energized in the right hand position as shown in FIG. 4, and both pumps will be deenergized when the switch is in its solid line central position as shown in that Figure.

Irrespective of whether or not an interlock is provided, for simple instructional devices of the type described herein, it has been found that the use of two separate pumps, one for drawing a vacuum and one for pressurizing the chamber, is far preferable and much less expensive then the use of complex valving means whereby to utilize a single pump for both pressure and vacuum as has been previously suggested. Moreover, the introduction of a movable platen in such an apparatus give rise to the ability of the apparatus to mold a wide variety of shapes notwithstanding its very simple construction.

While I have herein shown and described the preferred form of this invention and have suggested modifications thereto, other changes and modifications may be made therein within the scope of the appended claims without departing from the spirit and scope of this invention.

What is claimed is:

1. A unitary apparatus for giving instruction in vacuum forming and pressure forming and adapted for selectively actuating either, comprising:
    a. a housing defining a pump chamber and a pressure chamber;
    b. a platen in said pressure chamber for supporting a mold thereon;
    c. means for supporting a thermoplastic sheet in overlying relation with said pressure chamber;
    d. means for holding the thermoplastic sheet in said overlying relation with said pressure chamber;
    e. means for heating said sheet when in said overlying relation for softening said sheet:
    f. a pressure pump in said pump chamber;
    g. a vacuum pump in said pump chamber;
    h. passage means for connecting both said pumps to said pressure chamber; and
    i. means for selectively energizing said pressure pump and said vacuum pump, whereby to selectively pressure form and vacuum form said thermoplastic sheet.

2. The instructional apparatus of claim 1, wherein said platen is vertically movable, and further comprising means for vertically moving said platen.

3. The instructional apparatus of claim 1, wherein said means for heating said sheet comprises a hood slidably mounted on said housing for movement to and from a position overlying said pressure chamber, an electric heating element on said hood in underlying relation therewith, and means for controlling the energization of said electric heating element.

4. The instructional apparatus of claim 1, wherein said means for selectively energizing said two pumps includes a pair of independently operable switches, one for each pump.

5. The instructional apparatus of claim 3, wherein said platen is vertically movable, and further comprising means for vertically moving said platen.

6. The instructional apparatus of claim 5, wherein said means for selectively energizing said two pumps include a pair of independently operable switches, one for each pump.

7. The instructional apparatus of claim 1, wherein said means for selectively energizing said two pumps include means for interlocking said two pumps, whereby said pumps are energizable only one at a time.

8. The instructional apparatus of claim 7, wherein said interlocking means includes a three position switch.

9. The instructional apparatus of claim 8, wherein said platen is vertically movable, and further comprising means for vertically moving said platen.

10. The instructional apparatus of claim 9, wherein said means for heating said sheet comprises a hood slidably mounted on said housing for movement to and from a position overlying said pressure chamber, an electric heating element on said hood in underlying relation therewith, and means for controlling the energization of said electric heating element.

* * * * *